US012681962B2

(12) United States Patent
     Khanna et al.

(10) Patent No.: US 12,681,962 B2
(45) Date of Patent: Jul. 14, 2026

(54) PROMPT PERSONALIZATION FOR GENERATIVE MODELS

(71) Applicant: ADOBE INC., San Jose, CA (US)

(72) Inventors: Anand Khanna, San Jose, CA (US);
            Abhishek Tandon, San Jose, CA (US);
            Nikolaos Vlassis, San Jose, CA (US);
            Oliver Brdiczka, San Jose, CA (US)

(73) Assignee: ADOBE INC., San Jose, CA (US)

( * ) Notice: Subject to any disclaimer, the term of this patent is extended or adjusted under 35 U.S.C. 154(b) by 2 days.

(21) Appl. No.: 18/958,801

(22) Filed: Nov. 25, 2024

(65) Prior Publication Data

US 2025/0298815 A1     Sep. 25, 2025

Related U.S. Application Data

(60) Provisional application No. 63/567,870, filed on Mar. 20, 2024.

(51) Int. Cl.
     G06F 16/332     (2025.01)
     G06T 11/00     (2006.01)
(52) U.S. Cl.
     CPC .......... G06F 16/3322 (2019.01); G06T 11/00 (2013.01); G06T 2200/24 (2013.01)
(58) Field of Classification Search
     CPC .. G06F 16/3322; G06T 11/00; G06T 2200/24
     USPC ........................................................ 707/758
     See application file for complete search history.

(56) References Cited

U.S. PATENT DOCUMENTS

| | | | |
|---|---|---|---|
| 10,565,255 B2 * | 2/2020 | Jiang ................... | G06F 16/9535 |
| 10,713,821 B1 * | 7/2020 | Surya ...................... | G06F 40/30 |
| 10,783,398 B1 * | 9/2020 | Ranzinger .............. | G06F 16/56 |
| 11,941,678 B1 * | 3/2024 | Sadr .................. | G06Q 30/0627 |
| 12,205,207 B2 * | 1/2025 | Smetanin ............. | G06F 3/0482 |
| 2024/0127511 A1 * | 4/2024 | Brdiczka ................ | G06F 40/30 |
| 2024/0193351 A1 * | 6/2024 | Benedetto ............ | G06F 3/0482 |
| 2024/0202796 A1 * | 6/2024 | Sadr ................... | G06Q 30/0621 |
| 2024/0221235 A1 * | 7/2024 | Gafni .................... | H04L 9/3213 |
| 2024/0249318 A1 * | 7/2024 | Spiegel .................. | H04L 51/02 |
| 2024/0267344 A1 * | 8/2024 | Mulligan .............. | H04L 51/212 |
| 2024/0289407 A1 * | 8/2024 | Rofouei ............. | G06F 16/9577 |
| 2024/0291779 A1 * | 8/2024 | Catalano ................ | H04L 51/52 |
| 2024/0295953 A1 * | 9/2024 | Zakharov ............... | G06T 11/00 |
| 2024/0320867 A1 * | 9/2024 | Bean .................... | G06F 16/532 |

(Continued)

OTHER PUBLICATIONS

1Vaswani, et al., "Attention Is All You Need", arXiv preprint arXiv:1706.03762v7 [cs.CL] Aug. 2, 2023, 15 pages.

(Continued)

*Primary Examiner* — Cam Linh T Nguyen
(74) *Attorney, Agent, or Firm* — F. CHAU & ASSOCIATES, LLC

(57)     ABSTRACT

A method, apparatus, non-transitory computer readable medium, and system for generating suggested prompts include obtaining a sequence of text prompts associated with a user and determining a session concept for the user based on the sequence of text prompts. Embodiments then generate, using a prompt generation model, an image generation prompt based on the sequence of text prompts and the session concept. Subsequently, embodiments generate, using an image generation model, a synthetic image based on the image generation prompt.

20 Claims, 15 Drawing Sheets

(56) References Cited

U.S. PATENT DOCUMENTS

| | | | |
|---|---|---|---|
| 2024/0355022 A1* | 10/2024 | Shi | G06T 9/00 |
| 2024/0377792 A1* | 11/2024 | Brown | G05B 13/027 |
| 2024/0412029 A1* | 12/2024 | Yang | G06N 3/0475 |
| 2025/0077765 A1* | 3/2025 | Xu | G06F 40/56 |
| 2025/0078323 A1* | 3/2025 | Paliarush | G06T 11/00 |
| 2025/0078327 A1* | 3/2025 | Bao | G06T 11/00 |
| 2025/0095222 A1* | 3/2025 | Sugden | G06F 3/0482 |
| 2025/0190459 A1* | 6/2025 | Conway | G06N 3/0475 |
| 2025/0191286 A1* | 6/2025 | Hao | G06T 15/20 |
| 2025/0284755 A1* | 9/2025 | Adcock | G06F 16/9535 |
| 2025/0285155 A1* | 9/2025 | Adcock | G06Q 30/0643 |

OTHER PUBLICATIONS

2Reimers, et al., "Sentence-BERT: Sentence Embeddings using Siamese BERT-Networks", arXiv preprint arXiv:1908.10084v1 [cs. CL] Aug. 27, 2019, 11 pages.

3Brown, et al., "Language Models are Few-Shot Learners", arXiv preprint arXiv:2005.14165v4 [cs.CL] Jul. 22, 2020, 75 pages.

4Liu, et al., "Visual Instruction Tuning", arXiv preprint arXiv:2304. 08485v2 [cs.CV] Dec. 11, 2023, 25 pages.

* cited by examiner

Pixel Space
410　405

Latent Space
425

420

Forward Diffusion Process
430

435

Reverse Diffusion Process

440

445

450

455

$\mathcal{E}$
415

$D$
450

460

465

470

Guidance Space
475

400

Obtain a sequence of text prompts
1005

Determine a session concept based on the sequence of text prompts
1010

Generate an image generation prompt based on the sequence of text prompts and the session concept
1015

Generate a synthetic image based on the image generation prompt
1020

1000

PROMPT PERSONALIZATION FOR GENERATIVE MODELS

CROSS-REFERENCE TO RELATED APPLICATION

This U.S. non-provisional application claims priority under 35 U.S.C. § 119 to U.S. Provisional Patent Application No. 63/567,870, filed on Mar. 20, 2024, in the United States Patent and Trademark Office, the disclosure of which is incorporated by reference herein in its entirety.

BACKGROUND

The following relates generally to machine learning, and more specifically to prompt suggestion and personalization. Machine learning is a subset of artificial intelligence and involves the development of algorithms that enable computers to learn from and make predictions or decisions based on data. This field uses statistical methods to enable machines to improve at tasks with experience and training. The motivation behind machine learning is to automate decision-making and generative processes by identifying patterns and making decisions with minimal human intervention.

Some applications of machine learning include sequence modeling and image generation. Sequence modeling involves predicting the next item in a sequence, whether it be text, time series data, or genetic sequences, leveraging patterns recognized from previous data. Image generation involves creating new images based on a set of training images, allowing machines to produce visuals that did not previously exist. Some image generation systems allow users to provide prompts, which are descriptive inputs that are used to guide the generation process. These prompts can range from simple descriptions or keywords to complex, structured instructions that direct the model's output.

SUMMARY

Embodiments of the inventive concepts described herein include systems and methods for generating prompt suggestions to a user, and for generating media based on the prompt suggestions. Embodiments include a prompt generation apparatus configured to extract a concept from a sequence of prompts, and further configured to suggest new prompts anchored in that concept. The prompt generation apparatus includes a machine learning model that includes a prompt generation model and a concept generation model. The concept generation model is a language model (LM) that is configured to determine a concept based on a sequence of prompts. The prompt generation model is an LM that is trained to predict a prompt given the concept and one or more previous prompts. Embodiments further include additional LM models and an image generation model that are used in the generation of training data for training the prompt generation model. The training process entails training the LM of the prompt generation model from scratch to learn to predict prompts. Some embodiments further utilize historical user session data to construct training data for the prompt generation model.

A method, apparatus, non-transitory computer readable medium, and system for prompt suggestion and personalization are described. One or more aspects of the method, apparatus, non-transitory computer readable medium, and system include obtaining a sequence of text prompts associated with a user; determining a session concept for the user based on the sequence of text prompts; generating, using a prompt generation model, an image generation prompt based on the sequence of text prompts and the session concept; and generating, using an image generation model, a synthetic image based on the image generation prompt.

A method, apparatus, non-transitory computer readable medium, and system for prompt suggestion and personalization are described. One or more aspects of the method, apparatus, non-transitory computer readable medium, and system include identifying a user session; receiving a sequence of text prompts during the user session; determining a session concept based on the sequence of text prompts; and generating, using a prompt generation model, an image generation prompt based on the sequence of text prompts and the session concept.

An apparatus, system, and method for prompt suggestion and personalization are described. One or more aspects of the apparatus, system, and method include a memory component; a processing device coupled to the memory component, the processing device configured to perform operations comprising; obtaining a sequence of text prompts; determining a session concept based on the sequence of text prompts; generating, using a prompt generation model, an image generation prompt based on the sequence of text prompts and the session concept; and generating, using an image generation model, a synthetic image based on the image generation prompt.

DETAILED DESCRIPTION

Users are increasingly using text-to-image models as part of their design process. Text-to-image models allow users to enter a descriptive prompt to generate images with content from the prompt. In some cases, the prompts are used in text-to-video models as well. Experimentally, users tend to stop interacting with generative models after inputting 2-3 prompts. This may be because the users: 1) got the image(s) they wanted, 2) were not satisfied with the generated images, or 3) lack the inspiration for other prompts. Embodiments of the present disclosure aid users in their design process by providing inspiration by suggesting additional prompts that are relevant to the current session.

A "session" refers to a sequence of prompts that share a unifying concept. In some cases, the sequence of prompts may indicate personal preferences of a user. For example, a user may instantiate different sessions in a design application for different creative ideas, such as designing a cover for a children's book, designing a slide deck for work, or designing a holiday flyer. In other examples, the unifying concept corresponds to a logo or a corporate brand. In some cases, a session is defined by a unifying concept across a sequence of prompts, a continuous log-in time for a user, a session label, a user session selection, a user identity, a machine learning prompt classification, or some combination thereof.

Conventional systems for prompt auto-complete and prompt expansion, unlike the present embodiments, do not consider the instant concepts of the session with each suggestion. This results in suggestions that are based only on the current or most recent prompt, resulting in suggestions that can vary from the concept, and then in turn resulting in generated content that is unrelated to the concept. Embodiments of the present inventive concepts are configured to suggest prompts to a user that are personalized to the user.

Figure 1:
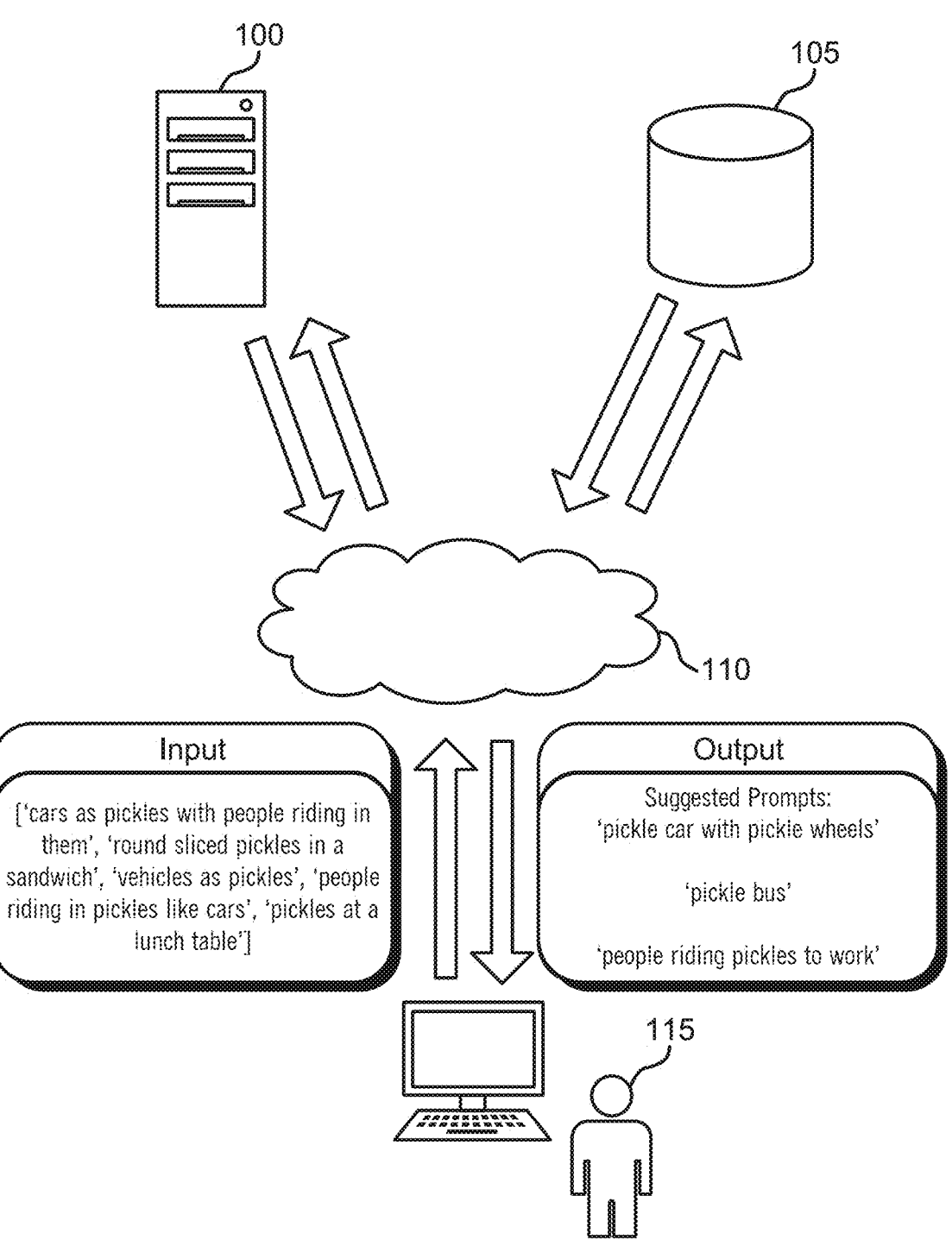
FIG. 1 shows an example of a prompt generation system according to aspects of the present disclosure.

FIG. 1 shows an example of a prompt generation system according to aspects of the present disclosure. The example shown includes prompt generation apparatus 100, database 105, network 110, and user 115. Prompt generation apparatus 100 is an example of, or includes aspects of, the corresponding element described with reference to FIG. 2.

In an example user case, a user interacts with the system by generating one or more images with descriptive prompts. The system then extracts the prompts from the session, generates a concept from the set of extracted prompts, appends the sequence of prompts to the generated concept to form an input for a prompt generation model, and then suggests one or more additional prompts that are personalized to the user.

Embodiments of prompt generation apparatus 100 are implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Database 105 stores information used by the system including model parameters, user data and session data, pre-cached or pre-known concepts, stock images, and the like. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with a database controller. In other cases, the database controller may operate automatically without user interaction.

Network 110 facilitates the transfer of information between prompt generation apparatus 100, database 105, and user 115. In some cases, a network 110 is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, prompt generation apparatus 100 concatenates a token representing the session concept to a sequence of tokens representing the sequence of text prompts to obtain an augmented input, where the prompt suggestion is generated based on the augmented input. In some aspects, the sequence of text prompts corresponds to an image generation session. In some aspects, the prompt suggestion includes a detailed description of an image to be generated by the image generation model. Prompt generation apparatus 100 is an example of, or includes aspects of, the corresponding element described with reference to FIG. 2.

Figure 2:
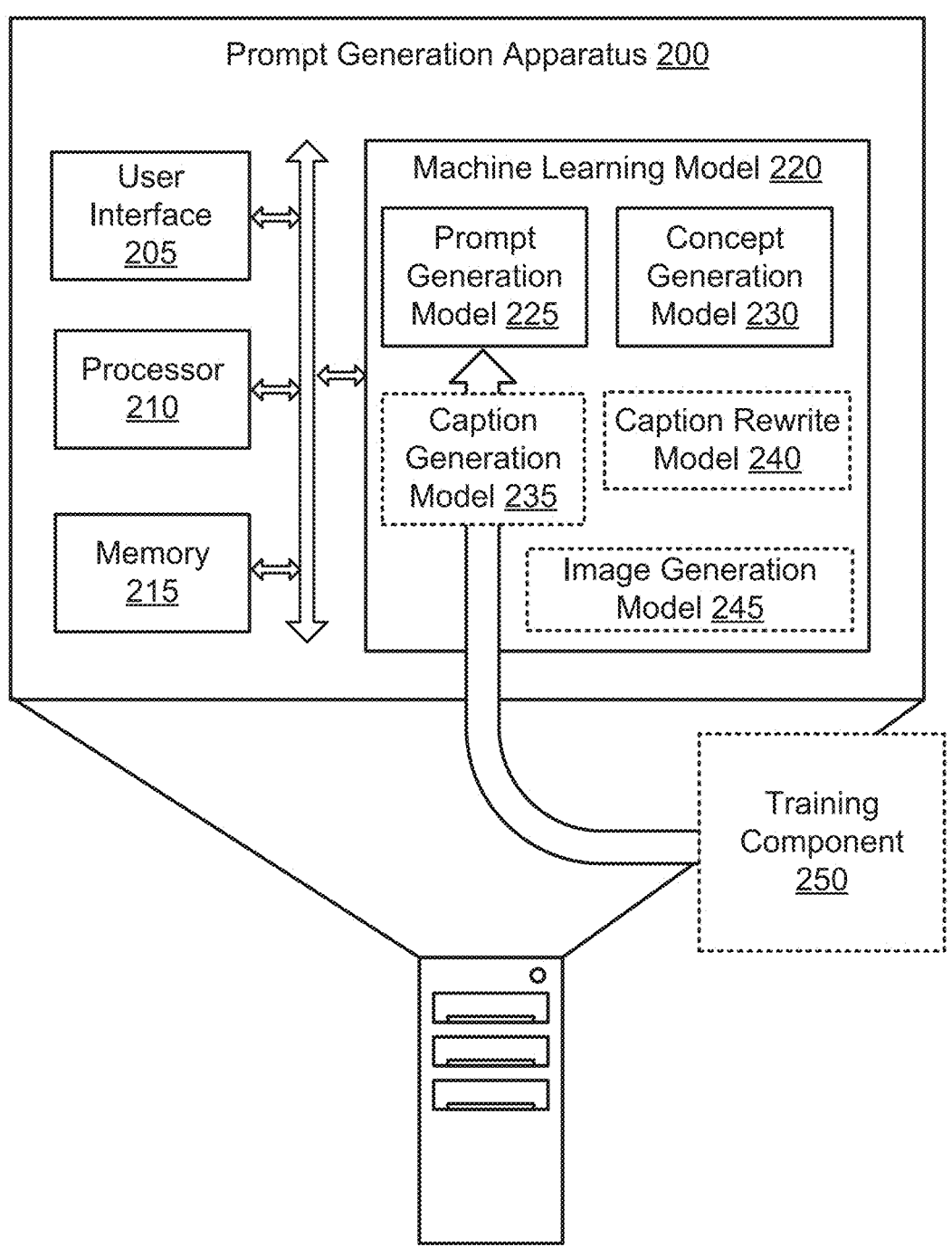
FIG. 2 shows an example of a prompt generation apparatus according to aspects of the present disclosure.

FIG. 2 shows an example of a prompt generation apparatus 200 according to aspects of the present disclosure. The example shown includes prompt generation apparatus 200, user interface 205, processor 210, memory 215, machine learning model 220, and training component 250. Prompt generation apparatus 200 is an example of, or includes aspects of, the corresponding element described with reference to FIG. 1. The components represented by dotted lines may be implemented on an apparatus different from prompt generation apparatus 200.

Prompt generation model 225 is an example of, or includes aspects of, the corresponding element described with reference to FIGS. 6 and 7. Concept generation model 230 is an example of, or includes aspects of, the corresponding element described with reference to FIGS. 6 and 12. Caption generation model 235 is an example of, or includes aspects of, the corresponding element described with reference to FIG. 12. Caption rewrite model 240 is an example of, or includes aspects of, the corresponding element described with reference to FIG. 12.

A user interface 205 may enable a user to interact with a device. In some embodiments, the user interface 205 may include an audio device, such as an external speaker system, an external display device such as a display screen, or an input device (e.g., remote control device interfaced with the user interface 205 directly or through an IO controller module). In some cases, a user interface 205 may be a graphical user interface (GUI). A GUI is described with reference to FIG. 9.

A processor 210 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 210 is configured to operate a memory 215 array using a memory controller. In other cases, a memory controller is integrated into the processor 210. In some cases, the processor 210 is configured to execute computer-readable instructions stored in a memory 215 to perform various functions. In some embodiments, a processor 210 includes special purpose components for modem processing, baseband processing, digital signal processing, or transmission processing.

Examples of a memory device include random access memory (RAM), read-only memory (ROM), or a hard disk. Examples of memory devices include solid state memory and a hard disk drive. In some examples, memory 215 is used to store computer-readable, computer-executable software including instructions that, when executed, cause a processor 210 to perform various functions described herein. In some cases, the memory 215 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 215 store information in the form of a logical state.

Machine learning model 220 in includes various models for generating text and images. Embodiments of machine learning model 220 includes artificial neural network (ANN) components, such as language models and image generation models. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, prompt generation model 225, concept generation model 230, caption generation model 235, and caption rewrite model 240 include a transformer architecture. A transformer or transformer network is a type of neural network models used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

Prompt generation model 225 is used to predict new prompts. The prompt generation model 225 generates the prompts based on a concept extracted from a user session or a pre-known concept, as well as one or more prompts from the user session. Embodiments of prompt generation model 225 include a transformer architecture such as GPT-2 that is trained from scratch according to training processes described herein. Concept generation model 230 is used to generate a concept from a user session. A concept is the essence of the prompts within a sequence of prompts, and can be represented by words or tokens. For example, in the example shown in FIG. 1, the concept might be "pickle" or "pickle vehicle." Caption generation model 235 is an image-to-text model that is used to generate captions from images. Embodiments of caption generation model 235 include, e.g., BLIP-2 or "llava." The captions are training data, and represent example prompts that might be used to generate the images in a training set. Caption rewrite model 240 takes a generic caption generated by caption generation model 235 and a concept, and rewrites the caption to focus on the specific concept. The re-written concepts a part of the training data for training prompt generation model 225. Training methods are described with reference to FIGS. 11-14.

Image generation model 245 is used to generate images. According to some aspects, a user session includes a user providing one or more prompts with the intent of generating images from those prompts. The image generation model 245 provides synthesized images to the user based on their prompts. The prompt generation model 225 may provide new prompts related to the concept of the previous prompts which can also be used by image generation model 245 to generate images. An example architecture and operation of image generation model 245 is described with reference to FIG. 4.

Training component 250 is used to prepare training data and to update parameters of machine learning model 220 during one or more training phases. In one aspect, machine learning model 220 includes prompt generation model 225, concept generation model 230, caption generation model 235, caption rewrite model 240, and image generation model 245.

According to some aspects, prompt generation model 225 is trained "from scratch," i.e., has no encoded knowledge prior to the training process. Concept generation model 230 may be pre-trained, and the training process may fine-tune the model to generate concepts given a prompt or caption. Caption generation model 235 and caption rewrite model 240 may be pre-trained and not updated during the training phase(s), though embodiments are not limited thereto.

According to some aspects, machine learning model 220 generates a prompt suggestion for the image generation model 245 based on the sequence of text prompts. In some examples, machine learning model 220 generates an additional prompt suggestion based on the feedback and the sequence of text prompts. In some aspects, the machine learning model 220 is trained using training data including a training sequence of text prompts.

According to some aspects, concept generation model 230 generates a session concept based on the sequence of text prompts, where the prompt suggestion is based on the session concept. According to some aspects, concept generation model 230 is trained to generate a session concept based on the sequence of text prompts, wherein the machine learning model 220 takes the session concept as an input. According to some aspects, image generation model 245 is trained to generate a synthetic image based on the prompt suggestion.

According to some aspects, training component 250 obtains a training set including a training sequence of text prompts. In some examples, training component 250 trains, using the training set, machine learning model 220 to generate a prompt suggestion based on a sequence of text prompts. In some examples, training component 250 receives the training sequence of text prompts from a user during an image generation session.

In some examples, training component 250 obtains a set of sequences of text prompts from a set of image generation sessions, respectively. In some examples, training component 250 filters the set of sequences of text prompts, where the training set is based on the filtered set sequences of text prompts. In some aspects, the training set includes a session concept corresponding to the training sequence, where the machine learning model 220 is trained to generate the prompt suggestion based on an input session concept. In some examples, training component 250 trains a concept generation model 230 to generate the session concept based on the training sequence of text prompts. In some examples, training component 250 computes a loss function by comparing text of the predicted prompt suggestion to a text prompt from the training sequence of text prompts. In some examples, training component 250 updates parameters of the machine learning model 220 based on the loss function. Additional detail regarding training processes is provided with reference to FIG. 13.

In some aspects, the prompt generation model 225 is trained using training data including a training sequence of text prompts and a training concept corresponding to the training sequence of text prompts. In some aspects, the training sequence of text prompts is filtered based on prompt consistency. In some examples, training component 250 computes pairwise distances between the sentence-level embeddings. In some aspects, the prompt generation model 225 is trained using training data including a set of image captions and a training concept corresponding to the set of image captions. Additional detail regarding training data generation and training methods is provided with reference to FIGS. 11-14.

Figure 3:
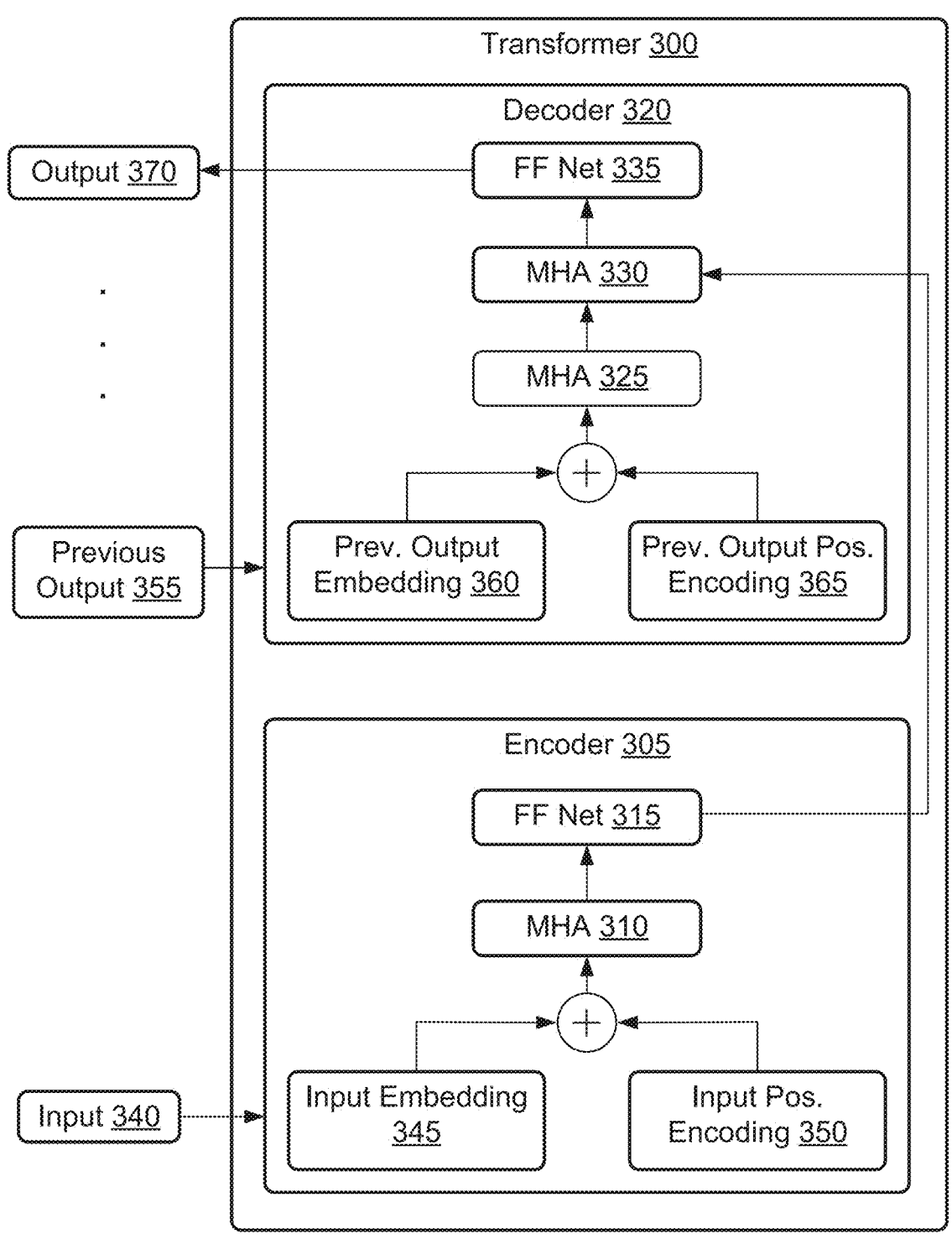
FIG. 3 shows an example of a transformer according to aspects of the present disclosure.

FIG. 3 shows an example of a transformer network according to aspects of the present disclosure. The example shown includes transformer 300, encoder 305, decoder 320, input 340, input embedding 345, input positional encoding 350, previous output 355, previous output embedding 360, previous output positional encoding 365, and output 370. The transformer network architecture may be implemented within the prompt generation model 225, the concept generation model 230, the caption generation model 235, or the caption rewrite model 240 as described with reference to FIG. 2.

In some cases, encoder 305 includes multi-head self-attention sublayer 310 and feed-forward network sublayer 315. In some cases, decoder 320 includes first multi-head self-attention sublayer 325, second multi-head self-attention sublayer 330, and feed-forward network sublayer 335.

According to some aspects, a machine learning model comprises transformer 300. In some cases, encoder 305 is configured to map input 340 (for example, a query or a prompt comprising a sequence of words or tokens) to a sequence of continuous representations that are fed into decoder 320. In some cases, decoder 320 generates output 370 (e.g., a prediction of an output sequence of words or tokens) based on the output of encoder 305 and previous output 355 (e.g., a previously predicted output sequence), which allows for the use of autoregression.

For example, in some cases, encoder 305 parses input 340 into tokens and vectorizes the parsed tokens to obtain input embedding 345, and adds input positional encoding 350 (e.g., positional encoding vectors for input 340 of a same dimension as input embedding 345) to input embedding 345. In some cases, input positional encoding 350 includes information about relative positions of words or tokens in input 340.

In some cases, encoder 305 comprises one or more encoding layers (e.g., six encoding layers) that generate contextualized token representations, where each representation corresponds to a token that combines information from other input tokens via self-attention mechanism. In some cases, each encoding layer of encoder 305 comprises a multi-head self-attention sublayer (e.g., multi-head self-attention sublayer 310). In some cases, the multi-head self-attention sublayer implements a multi-head self-attention mechanism that receives different linearly projected versions of queries, keys, and values to produce outputs in parallel. In some cases, each encoding layer of encoder 305 also includes a fully connected feed-forward network sublayer (e.g., feed-forward network sublayer 315) comprising two linear transformations surrounding a Rectified Linear Unit (ReLU) activation:

$$FFN(x) = ReLU(W_1 x + b_1)W_2 + b_2 \qquad (1)$$

9
10

In some cases, each layer employs different weight parameters ($W_1$, $W_2$) and different bias parameters ($b_1$, $b_2$) to apply a same linear transformation to each word or token in input 340.

In some cases, each sublayer of encoder 305 is followed by a normalization layer that normalizes a sum computed between a sublayer input x and an output sublayer(x) generated by the sublayer:

$$layernorm(x + \text{sublayer}(x)) \qquad (2)$$

In some cases, encoder 305 is bidirectional because encoder 305 attends to each word or token in input 340 regardless of a position of the word or token in input 340.

In some cases, decoder 320 comprises one or more decoding layers (e.g., six decoding layers). In some cases, each decoding layer comprises three sublayers including a first multi-head self-attention sublayer (e.g., first multi-head self-attention sublayer 325), a second multi-head self-attention sublayer (e.g., second multi-head self-attention sublayer 330), and a feed-forward network sublayer (e.g., feed-forward network sublayer 335). In some cases, each sublayer of decoder 320 is followed by a normalization layer that normalizes a sum computed between a sublayer input x and an output sublayer(x) generated by the sublayer.

In some cases, decoder 320 generates previous output embedding 360 of previous output 355 and adds previous output positional encoding 365 (e.g., position information for words or tokens in previous output 355) to previous output embedding 360. In some cases, each first multi-head self-attention sublayer receives the combination of previous output embedding 360 and previous output positional encoding 365 and applies a multi-head self-attention mechanism to the combination. In some cases, for each word in an input sequence, each first multi-head self-attention sublayer of decoder 320 attends only to words preceding the word in the sequence, and so transformer 300's prediction for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 305 by receiving a query Q from a previous sublayer of decoder 320 and a key K and a value V from the output of encoder 305, allowing decoder 320 to attend to each word in the input 340.

In some cases, each feed-forward network sublayer implements a fully connected feed-forward network similar to feed-forward network sublayer 315. In some cases, the feed-forward network sublayers are followed by a linear transformation and a softmax function to generate a prediction of output 370 (e.g., a prediction of a next word or token in a sequence of words or tokens).

Figure 4:
FIG. 4 shows an example of a guided latent diffusion model according to aspects of the present disclosure.

FIG. 4 shows an example of a guided latent diffusion model according to aspects of the present disclosure. The guided latent diffusion model 400 depicted in FIG. 4 is an example of, or includes aspects of, the image generation model 245 described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 400 may take an original image 405 in a pixel space 410 as input and apply and image encoder 415 to convert original image 405 into original image features 420 in a latent space 425. Then, a forward diffusion process 430 gradually adds noise to the original image features 420 to obtain noisy features 435 (also in latent space 425) at various noise levels.

Next, a reverse diffusion process 440 (e.g., a U-Net ANN) gradually removes the noise from the noisy features 435 at the various noise levels to obtain denoised image features 445 in latent space 425. In some examples, the denoised image features 445 are compared to the original image features 420 at each of the various noise levels, and parameters of the reverse diffusion process 440 of the diffusion model are updated based on the comparison. Finally, an image decoder 450 decodes the denoised image features 445 to obtain an output image 455 in pixel space 410. In some cases, an output image 455 is created at each of the various noise levels. The output image 455 can be compared to the original image 405 to train the reverse diffusion process 440.

In some cases, image encoder 415 and image decoder 450 are pre-trained prior to training the reverse diffusion process 440. In some examples, they are trained jointly, or the image encoder 415 and image decoder 450 and fine-tuned jointly with the reverse diffusion process 440.

The reverse diffusion process 440 can also be guided based on a text prompt 460, or another guidance prompt, such as an image, a layout, a segmentation map, etc. The text prompt 460 can be encoded using a text encoder 465 (e.g., a multimodal encoder) to obtain guidance features 470 in guidance space 475. The guidance features 470 can be combined with the noisy features 435 at one or more layers of the reverse diffusion process 440 to ensure that the output image 455 includes content described by the text prompt 460. For example, guidance features 470 can be combined with the noisy features 435 using a cross-attention block within the reverse diffusion process 440.

Figure 5:
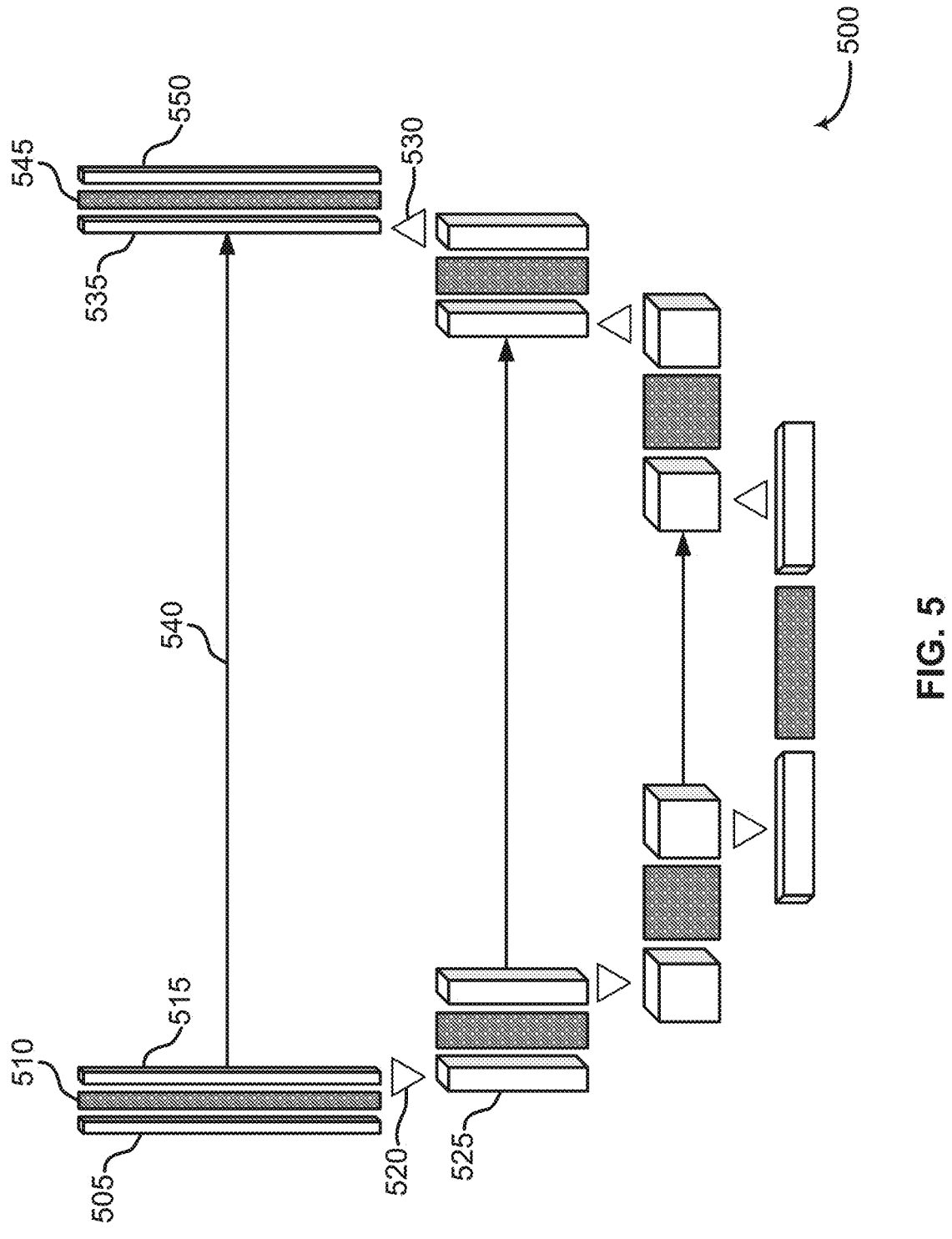
FIG. 5 shows an example of a U-Net architecture according to aspects of the present disclosure.

FIG. 5 shows an example of a U-Net 500 according to aspects of the present disclosure. In some examples, U-Net 500 is an example of the component that performs the reverse diffusion process 440 of guided diffusion model 400 described with reference to FIG. 4, and includes architectural elements of the image generation model 245 described with reference to FIG. 2.

In some examples, diffusion models are based on a neural network architecture known as a U-Net. The U-Net 500 takes input features 505 having an initial resolution and an initial number of channels, and processes the input features 505 using an initial neural network layer 510 (e.g., a convolutional network layer) to produce intermediate features 515. The intermediate features 515 are then down-sampled using a down-sampling layer 520 such that down-sampled features 525 have a resolution less than the initial resolution and a number of channels greater than the initial number of channels.

This process is repeated multiple times, and then the process is reversed. That is, the down-sampled features 525 are up-sampled using up-sampling process 530 to obtain up-sampled features 535. The up-sampled features 535 can be combined with intermediate features 515 having a same resolution and number of channels via a skip connection 540. These inputs are processed using a final neural network layer 545 to produce output features 550. In some cases, the output features 550 have the same resolution as the initial resolution and the same number of channels as the initial number of channels.

In some cases, U-Net 500 takes additional input features to produce conditionally generated output. For example, the additional input features could include a vector representation of an input prompt. The additional input features can be combined with the intermediate features 515 within the neural network at one or more layers. For example, a cross-attention module can be used to combine the additional input features and the intermediate features 515.

Figure 6:
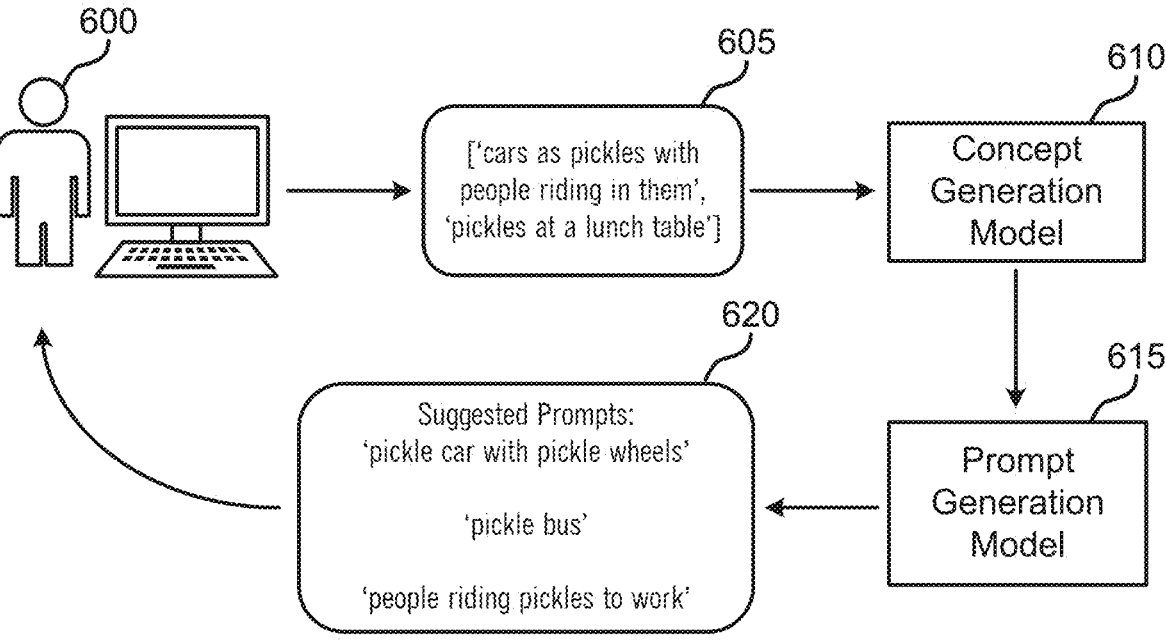
FIG. 6 shows an example of a pipeline for generating suggested prompts from an in-session concept according to aspects of the present disclosure.

FIG. 6 shows an example of a pipeline for generating suggested prompts 620 from an in-session concept according to aspects of the present disclosure. The example shown includes user 600, session prompts 605, concept generation model 610, prompt generation model 615, and suggested prompts 620.

Concept generation model 610 is an example of, or includes aspects of, the corresponding element described with reference to FIGS. 2 and 12. Prompt generation model 615 is an example of, or includes aspects of, the corresponding element described with reference to FIGS. 2 and 7.

In this example, a user 600 inputs one or more prompts during a creative session. The prompts may be, e.g., descriptions of images for the system to generate. The session prompts 605 are gathered and input to a concept generation model 610, which is a language model that generates a concept from the set of prompts. In this example, the concept may be "pickle" or "pickle car", or similar. Then, the system concatenates the generated concept to the session prompts 605 to form an input to the prompt generation model 615, which predicts one or more suggested prompts 620, which are presented to the user. For example, the system may generate an input of the form: <concept token(s)>, <separator token>, <first prompt token(s)>, <separator token>, . . . <Nth prompt token(s)>. Then, prompt generation model 615 predicts the N+1$^{st}$ prompt and suggests it to user 600.

In addition to training based on historical user sessions as described with reference to FIG. 4, embodiments are configured to generate new sessions for use as training data. This process is particularly useful for fine-tuning image generation models on particular concepts for enterprise solutions. At the end of this process, training data is generated that includes concept and prompt(s) sequences for training a prompt generation model, as well as image and caption pairs for fine-tuning an image generation model. The training data generation is described in greater detail with reference to FIGS. 11-12.

Figure 7:
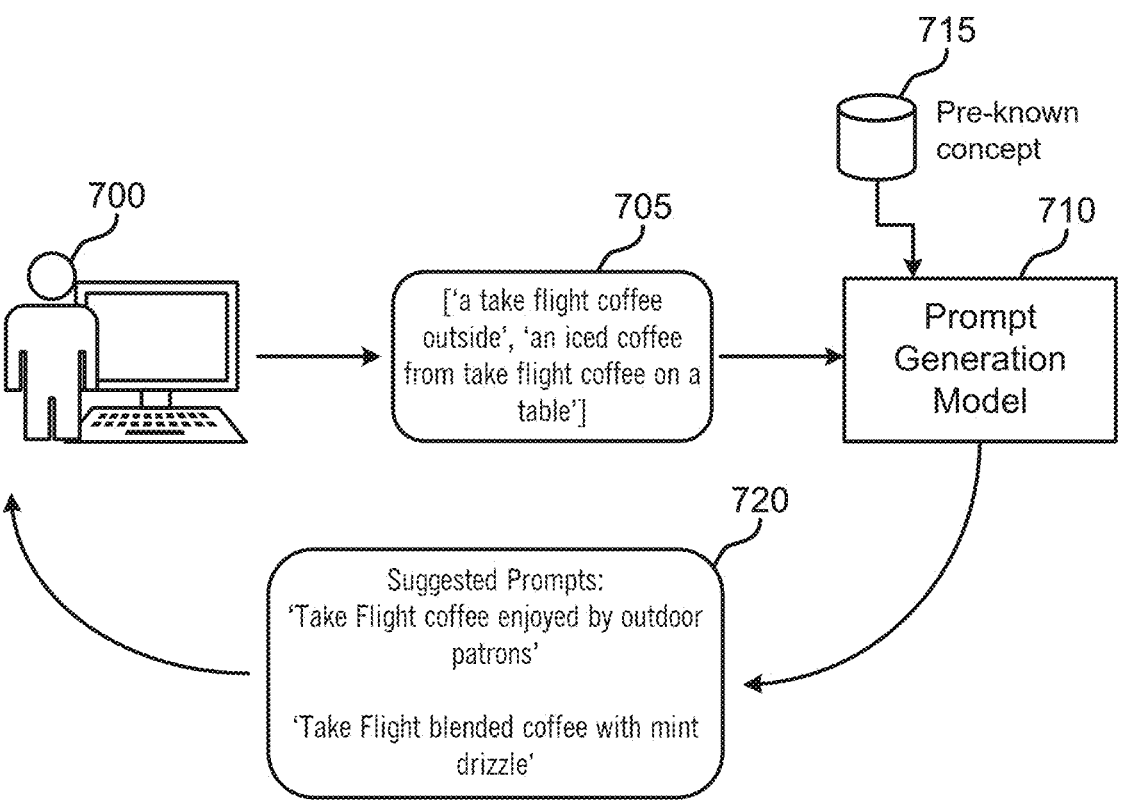
FIG. 7 shows an example of a pipeline for generating suggested prompts from a pre-known concept according to aspects of the present disclosure.

FIG. 7 shows an example of a pipeline for generating suggested prompts 720 from a pre-known concept according to aspects of the present disclosure. The example shown includes user 700, session prompts 705, prompt generation model 710, concept dictionary or look-up table 715, and suggested prompts 720.

Prompt generation model 710 is an example of, or includes aspects of, the corresponding element described with reference to FIGS. 2 and 6. Concept dictionary or look-up table 715 is an example of, or includes aspects of, the corresponding element described with reference to FIG. 12. Suggested prompts 720 is an example of, or includes aspects of, the corresponding element described with reference to FIGS. 6 and 9.

In this example, a user provides session prompts 705 during a creative session. A concept generation model may extract a concept from the session prompts 705 and correspond the concept to a concept dictionary or look-up table 715 to "set" the session concept. For example, the extracted concept may be "coffee", and the concept dictionary or look-up table may link the generic concept to, for example, a brand concept such as "Take Flight Coffee." In this way, future prompt suggestions will be rooted in the brand concept "Take Flight Coffee." Embodiments may alternatively set the session concept according to a user or admin pre-configured concept. In either case, the identified session concept and the session prompts 705 are concatenated and provided to prompt generation model 710, which then generates suggested prompts 720 that the system provides to the user.

Figure 8:
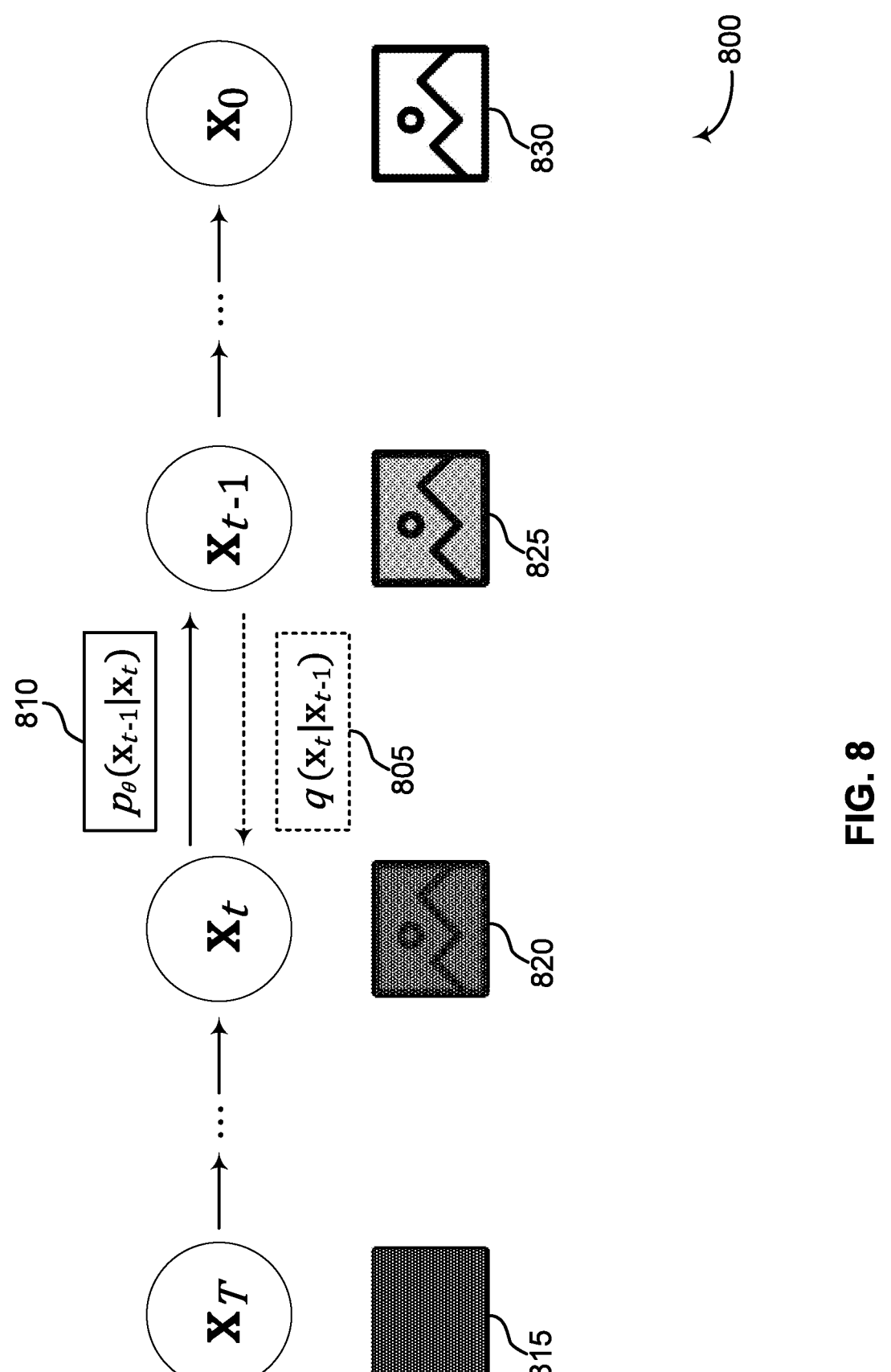
FIG. 8 shows an example of a method a diffusion process according to aspects of the present disclosure.

FIG. 8 shows a diffusion process 800 according to aspects of the present disclosure. In some examples, diffusion process 800 describes an operation of the image generation model 245 described with reference to FIG. 2, such as the reverse diffusion process 440 of guided latent diffusion model 400 described with reference to FIG. 4.

As described above with reference to FIG. 4, using a diffusion model can involve both a forward diffusion process 805 for adding noise to an image (or features in a latent space) and a reverse diffusion process 810 for denoising the images (or features) to obtain a denoised image. The forward diffusion process 805 can be represented as $q(x_t|x_{t-1})$, and the reverse diffusion process 810 can be represented as $p(x_{t-1}|x_t)$. In some cases, the forward diffusion process 805 is used during training to generate images with successively greater noise, and a neural network is trained to perform the reverse diffusion process 810 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 810, the model begins with noisy data $x_T$, such as a noisy image 815 and denoises the data to obtain the $p(x_{t-1}|x_t)$. At each step $t-1$, the reverse diffusion process 810 takes $x_t$, such as first intermediate image 820, and t as input. Here, t represents a step in the sequence of transitions associated with different noise levels, The reverse diffusion process 810 outputs $x_{t-1}$, such as second intermediate image 825 iteratively until $x_T$ reverts back to $x_0$, the original image 830. The reverse process can be represented as:

$$p_\theta(x_{t-1} \mid x_t) := N\left(x_{t-1}; \mu_\theta(x_t, t), \sum\nolimits_\theta(x_t, t)\right) \qquad (3)$$

The joint probability of a sequence of samples in the Markov chain can be written as a product of conditionals and the marginal probability:

$$x_T : p_\theta(x_{0:T}) := p(x_T) \prod\nolimits_{t=1}^{T} p_\theta(x_{t-1} \mid x_t) \qquad (4)$$

where $p(x) = N(x_T; 0, I)$ is the pure noise distribution as the reverse process takes the outcome of the forward process, a sample of pure noise, as input and $$\prod\nolimits_{t=1}^{T} p_\theta(x_{t-1} \mid x_t)$$

represents a sequence of Gaussian transitions corresponding to a sequence of addition of Gaussian noise to the sample.

At inference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 9:
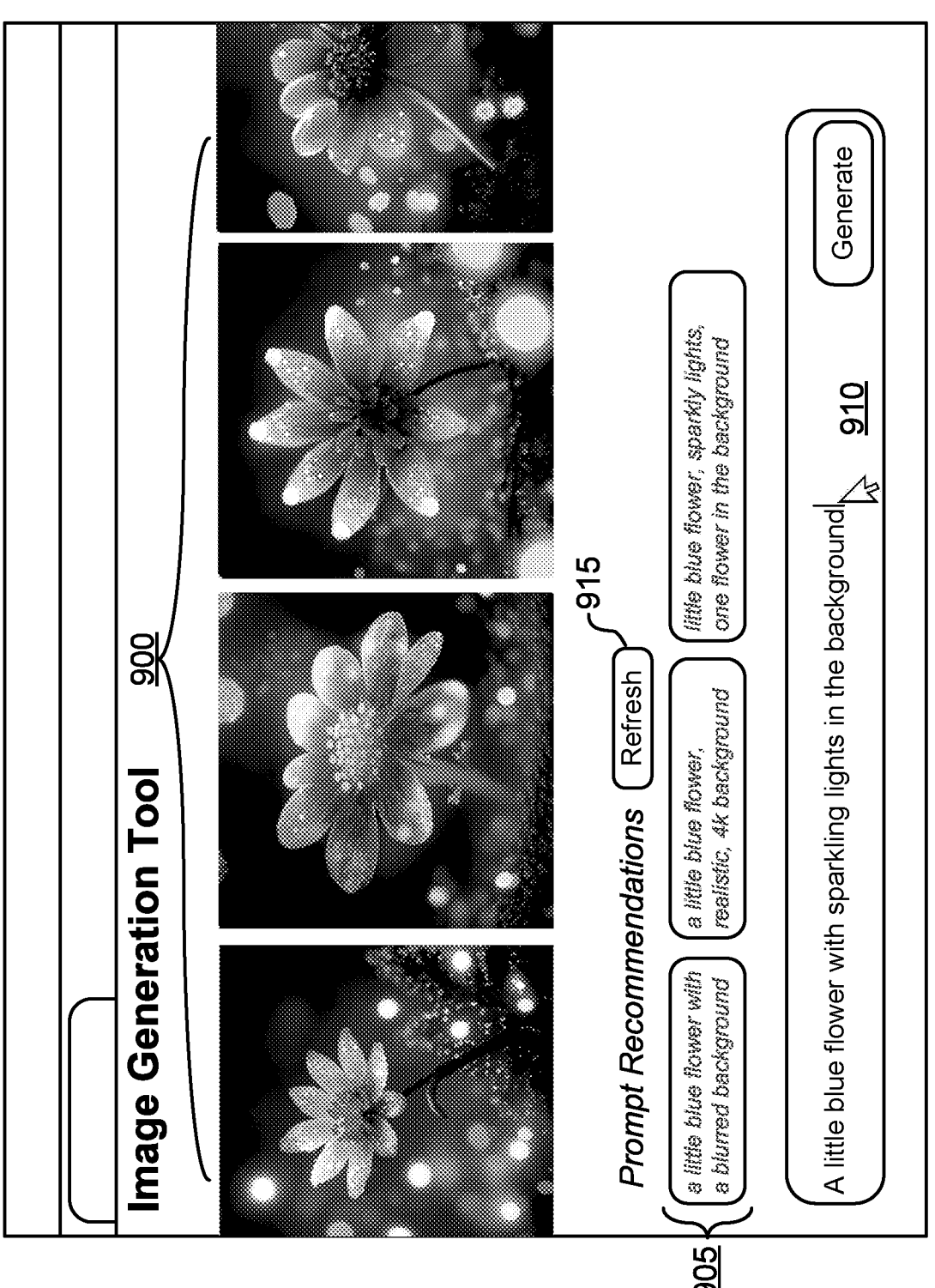
FIG. 9 shows an example of a graphical user interface according to aspects of the present disclosure.

FIG. 9 shows an example of a graphical user interface (GUI) according to aspects of the present disclosure. The example shown includes generated images 900, suggested prompts 905, text input 910, and refresh button 915. Suggested prompts 905 is an example of, or includes aspects of, the corresponding element described with reference to FIGS. 6 and 7.

The example shown shows generated images 900 that have been generated by one or more previous prompts from the user session. According to some aspects, the images were generated using an image generation model, such as the guided latent diffusion model as described with reference to FIG. 4. The user interface further includes suggested prompts 905, which may be generated by a prompt generation model as described with reference to FIG. 2. A user may enter additional prompts via text input 910, or may click one of the suggested prompts 905 which can populate the field of text input 910. The user can further click refresh button 915 to refresh the set of suggested prompts 905.

Figure 10:
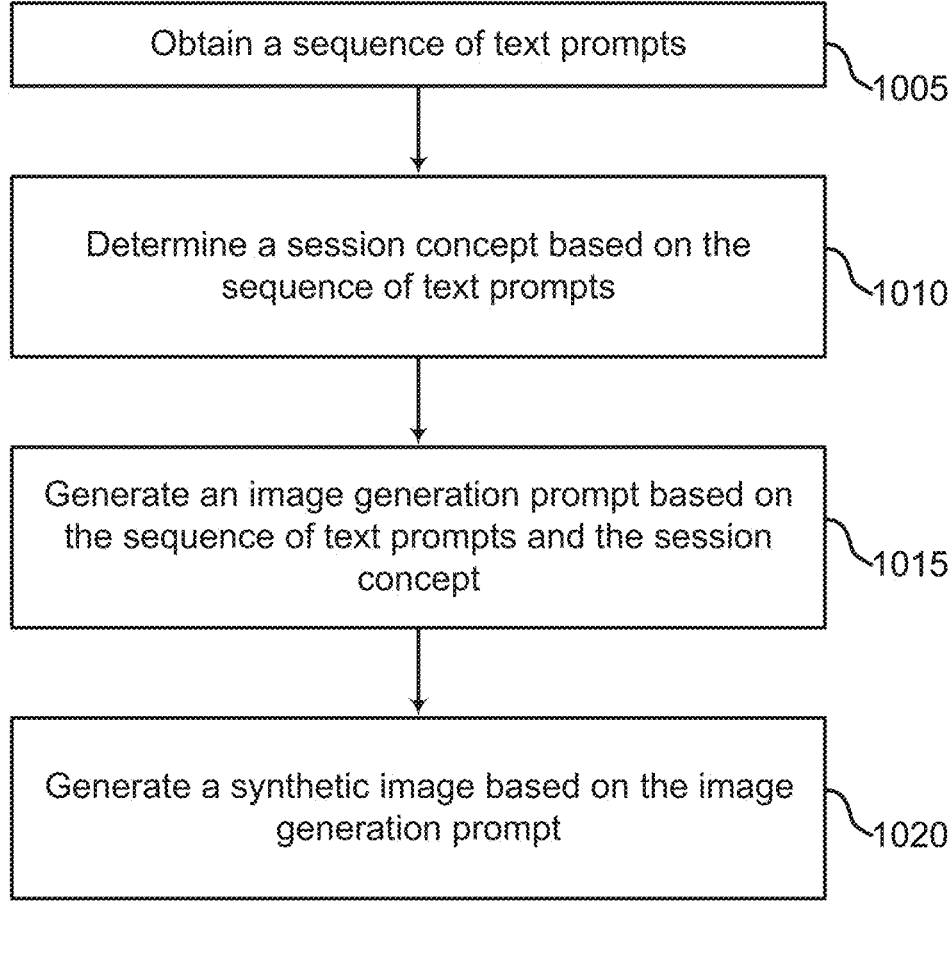
FIG. 10 shows an example of a method for generating a prompt and a synthetic image according to aspects of the present disclosure.

FIG. 10 shows an example of a method 1000 for generating a prompt and a synthetic image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system obtains a sequence of text prompts. In some cases, the operations of this step refer to, or may be performed by, a prompt suggestion apparatus as described with reference to FIG. 2. The sequence of text prompts may be, for example, session history provided by a user via interactions with a GUI. The session history may include media generation prompts, such as image generation prompts.

At operation 1010, the system determines a session concept based on the sequence of text prompts. In some cases, the operations of this step refer to, or may be performed by, a prompt suggestion apparatus as described with reference to FIG. 2. For example, the session concept may be generated based on the sequence of text prompts using a concept generation model or may be determined from a pre-known concept such as an enterprise brand or a topic as selected by an admin user.

The session concept can be an object, a brand, a logo, a shape, a category or any other element that can be depicted in the image. A session concept can be determined based on other prompts or engagements during a user sessions (e.g., a user image generation session). For example, FIG. 1 and FIG. 6 show an example based on the concept "pickle" determined from previous image generation prompts. Various other images can be generated that includes the concept of "pickle". In some cases the concept can include a combination of elements. As an example, FIGS. 7 and 12 show a concept of "take flight coffee" which includes both a brand element ("take flight") associated with a logo shape and an object ("coffee").

At operation 1015, the system generates an image generation prompt based on the sequence of text prompts and the session concept. In some cases, the operations of this step refer to, or may be performed by, a prompt generation model as described with reference to FIGS. 2, 6, and 7. The system may input the determined concept and the sequence of text prompts into the prompt generation model to obtain a token sequence prediction, which may be decoded to obtain the image generation prompt as text. Additional detail regarding the prompt generation process is described with reference to FIG. 6.

At operation 1020, the system generates a synthetic image based on the image generation prompt. In some cases, the operations of this step refer to, or may be performed by, an image generation model as described with reference to FIG. 2. Additional detail regarding the generative process is provided with reference to FIGS. 4 and 8. The system may display the synthetic image to the user via the GUI. According to some aspects, if the user is unsatisfied with the synthetic image, the user may ask the system to refresh the image generation prompt to obtain more prompt suggestions.

Figure 11:
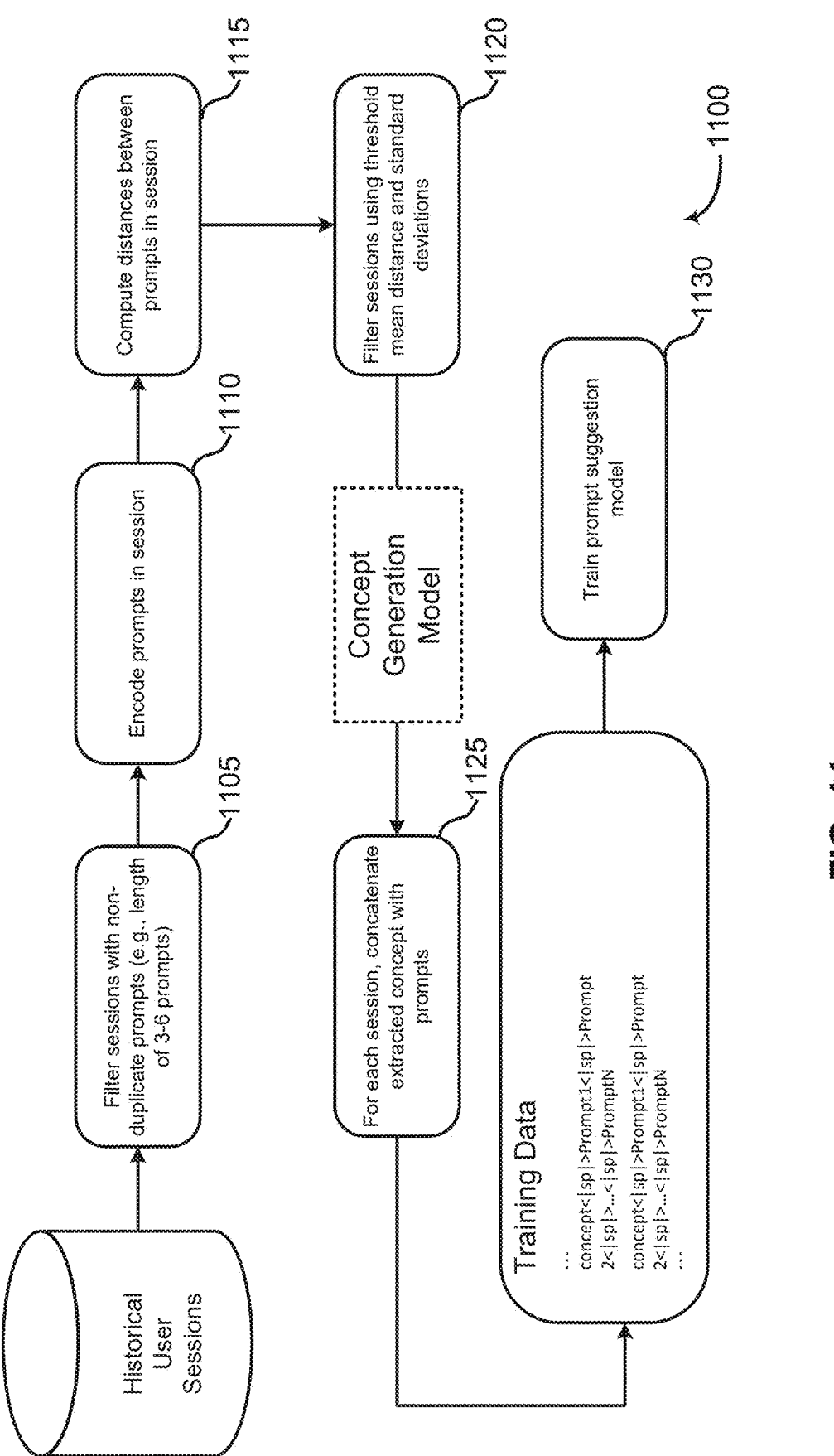
FIG. 11 shows an example of a method for generating training data from historical user sessions according to aspects of the present disclosure.

FIG. 11 shows an example of a method 1100 for generating training data from historical user sessions according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system obtains user sessions and initially filters the sessions. The sessions may be filtered to remove sessions with duplicate prompts, and to contain sessions with a length of 3-6 prompts. Filtering to this session length may allow computing pairwise distances between prompts later to be constrained to a limited number of pairs.

At operation 1110, the system tokenizes and encode the prompts in each session. According to some aspects, this operation is performed by a prompt encoder. The prompt encoder may be based on a transformer architecture, and may include a pre-trained encoder such as SBERT.

At operation 1115, the system computes distances between prompts within each session. The distances may be computed by calculating the distances between the encodings of the prompts. The distance may be calculated as, for example, a cosine distance.

At operation 1120, the system filters sessions with large prompt variance using threshold mean distance and standard deviation. For example, the set of sessions thus far may be further filtered to remove sessions that have prompts with large distances between each other, or sessions with prompts that exceed a threshold number of standard deviations from each other, where the standard deviation is based on the encodings of the prompts in that session. Accordingly, the system may further filter the sessions to yield sessions with a coherent concept.

A concept generation model may then extract a concept from each session. At operation 1125, the system, for each session, concatenates the extracted concept with the session's prompts. After this concatenation step, a session's data may look like the example shown in the training data box. For example, each data may include a concept, a separator token, and one or more prompt(s) with appended separator tokens. At operation 1130, the system trains the prompt generation model. For example, the training component may mask portions of the training data, and then ask the prompt generation model to infill or predict the next token(s) in the sequence. The training component may then compute differences between the prediction from the prompt generation model and the complete sequences from the training data. For example, the training component may compute a cross-entropy loss function based on the differences, and then backpropagate the loss function to update parameters of the prompt generation model during training. In this way, embodiments train the prompt generation model to produce personalized prompt suggestions based on an input including a concept and optionally one or more previous prompt(s).

Figure 12:
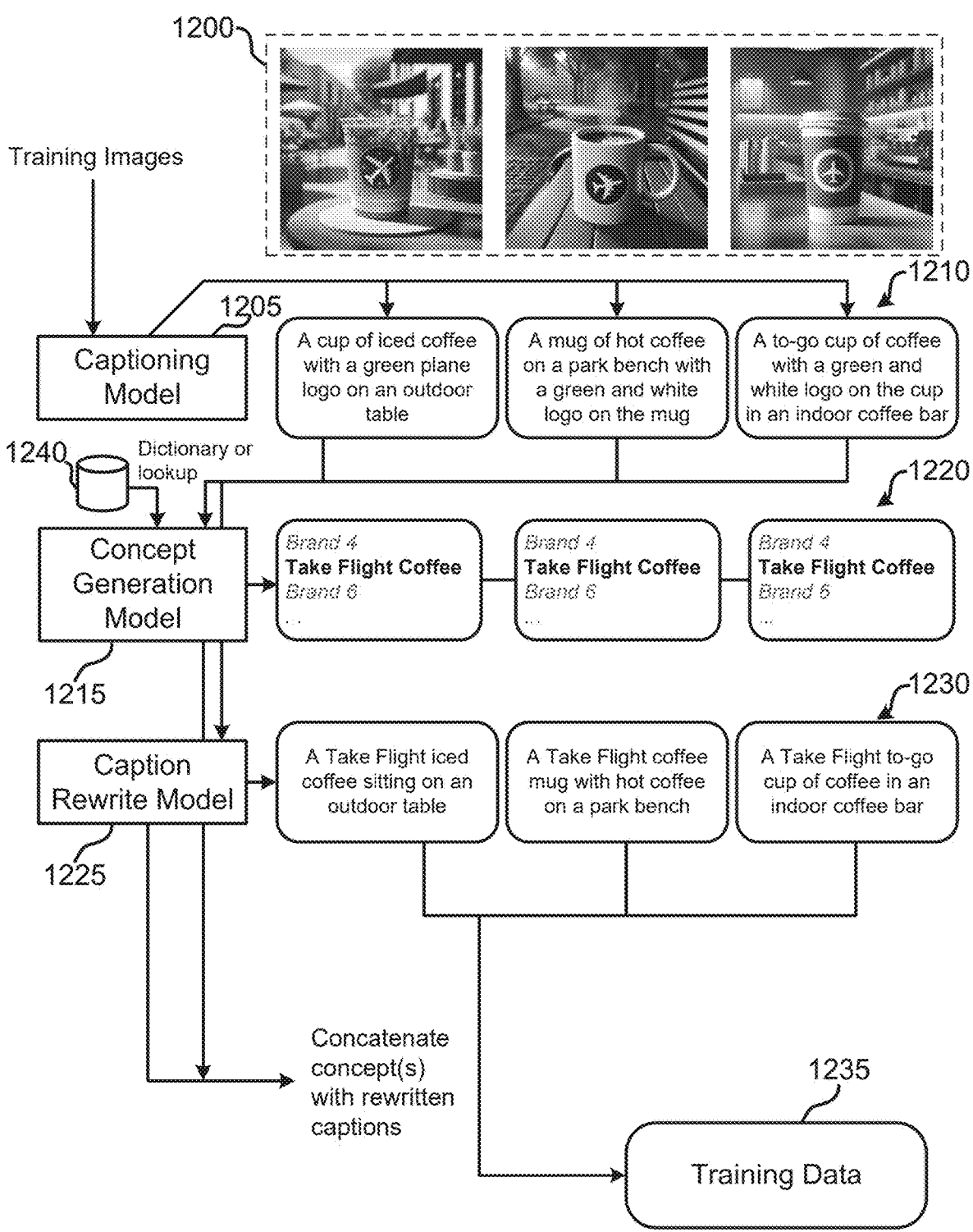
FIG. 12 shows an example of a pipeline for generating training data from training images according to aspects of the present disclosure.

FIG. 12 shows an example of a pipeline for generating training data 1235 from training images 1200 according to aspects of the present disclosure. The example shown includes training images 1200, caption generation model 1205, generic captions 1210, concept generation model 1215, identified concepts 1220, caption rewrite model 1225, concept-focused captions 1230, training data 1235, and concept dictionary or look-up table 1240.

Caption generation model 1205 is an example of, or includes aspects of, the corresponding element described with reference to FIG. 2. Concept generation model 1215 is an example of, or includes aspects of, the corresponding element described with reference to FIGS. 2 and 6. Caption rewrite model 1225 is an example of, or includes aspects of, the corresponding element described with reference to FIG. 2. Concept dictionary or look-up table 1240 is an example of, or includes aspects of, the corresponding element described with reference to FIG. 7.

The prompt generation models described herein may be trained by training data derived from historical user sessions as well as training data generated from training images. Embodiments are configured to generate captions for images, where the captions include one or more concepts. For example, for enterprise applications, embodiments may enforce the inclusion of a brand name concept such as "Take Flight" into generated captions for training images. These captions can be interpreted as ground-truth prompts, and can be concatenated with the concept (e.g. "Take Flight"), and used as training data similarly to the approach described with reference to FIG. 11. An advantageous byproduct of this training data generation process is the creation of paired image-caption data, which can be used to train an image generation model to associate textual descriptions of concepts with their visual representations in the training images.

In this example, a set of training images 1200 are input to a caption generation model 1205, which generates generic captions 1210 therefrom. According to some aspects, the generic captions 1210 do not include the intended concept. Accordingly, a concept generation model 1215, which may be augmented by an expert-curated concept dictionary or look-up table 1240, is used to correspond the content from generic captions 1210 to identified concepts 1220. For example, in the process of training a prompt generation model and an image generation model to learn about a brand "Take Flight Coffee," the concept dictionary or look-up table 1240 may be used to identify the concept "Take Flight Coffee" from all generic prompts that include anything about coffee. Since the generic captions 1210 are not suitable to train the prompt generation model and the image generation model to learn about the concept of "Take Flight Coffee," a caption rewrite model 1225 is used to rewrite the generic captions 1210 to center around the concept, producing concept-focused captions 1230. Accordingly, the generated sessions produce training data 1235 including concept with prompt(s) training data for training a prompt generation model (e.g., "Take Flight coffee"+concept-focused captions 1230), as well as image and caption pairs for fine-tuning an image generation model (e.g., training images 1200+concept-focused captions 1230). Accordingly, during inference time when a user provides the system with captions related to the pre-known concept, the prompt generation model will suggest new prompts anchored in that concept. The prompts may include words representing the concept that the image generation model has associated with visual features representing the concept from training. In this way, embodiments are configured to generate training session data that can be used to train a personalized prompt generation model and to finetune a personalized image generation model.

Figure 13:
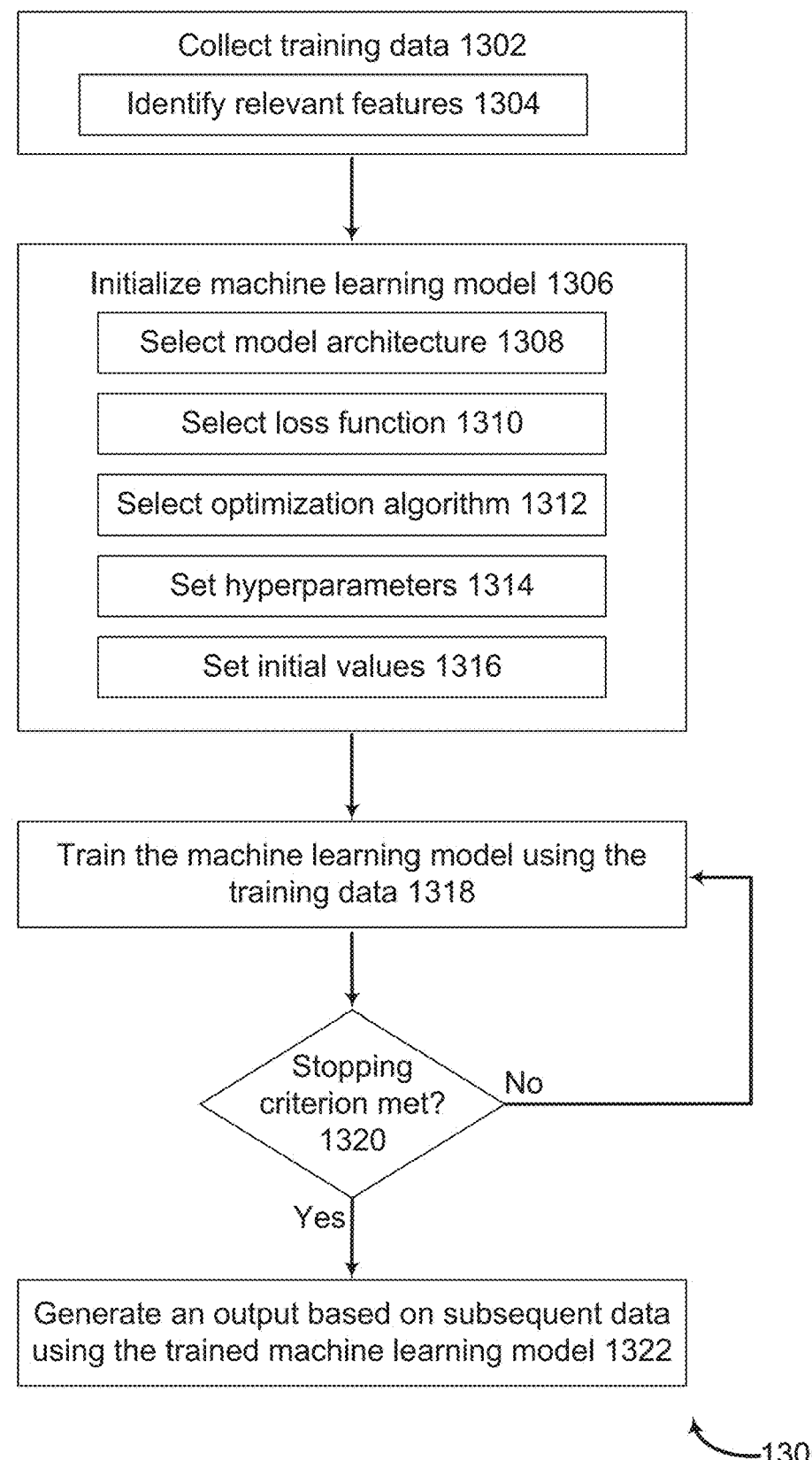
FIG. 13 shows an example of a method a step-by-step algorithm for training a machine learning model according to aspects of the present disclosure.

FIG. 13 is a flow diagram depicting an algorithm as a step-by-step procedure 1300 in an example implementation of operations performable for training a machine-learning model. In some embodiments, the procedure 1300 describes an operation of the training component 250 described for configuring the machine learning model 220 as described with reference to FIG. 2. The procedure 1300 provides one or more examples of generating training data, use of the training data to train a machine-learning model, and use of the trained machine-learning model to perform a task.

To begin in this example, a machine-learning system collects training data (block 1302) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth.

The machine-learning system is also configurable to identify features that are relevant (block 1304) to a type of task, for which, the machine-learning model is to be trained. Task examples include classification, natural language processing, generative artificial intelligence, recommendation engines, reinforcement learning, clustering, and so forth. For example, in training a prompt suggestion model, relevant features may include the semantic relationships between prompts in a session, the conceptual coherence of prompt sequences, and the hierarchical relationship between concepts and their associated prompts. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 1306). Initialization of the machine-learning model includes selecting a model architecture (block 1308) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc. For prompt suggestion models, transformer-based architectures may be used due to their ability to process sequential data and capture long-range dependencies between concepts and prompts via self-attention mechanisms.

A loss function is also selected (block 1310). The loss function is utilized to measure a difference between an output of the machine-learning model (i.e., predictions) and target values (e.g., as expressed by the training data) to be used to train the machine-learning model. Additionally, an optimization algorithm is selected (1312) that is to be used in conjunction with the loss function to optimize parameters of the machine-learning model during training, examples of which include gradient descent, stochastic gradient descent (SGD), and so forth.

Initialization of the machine-learning model further includes setting initial values of the machine-learning model (block 1314) examples of which includes initializing weights and biases of nodes to improve efficiency in training and computational resources consumption as part of training. Hyperparameters are also set that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 1318) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data. For a prompt suggestion model, the learning process may involve learning the relationship between concepts and their associated prompts. The model learns to recognize patterns in how prompts within a session relate to each other and to their underlying concepts enabling the model to predict prompts that include the concept.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

For example, in training a prompt suggestion model on sequences containing concepts and related prompts separated by special tokens, the model learns to attend to the concept at the beginning of the sequence and use this information to condition its predictions of subsequent prompts. The self-attention mechanisms in transformer architectures allow the model to learn both the local relationships between adjacent prompts and the global relationship between the concept and all prompts in the sequence. For example, during training, the model processes sequences of the form "<concept tokens><separator token><prompt 1 tokens><separator token><prompt 2 tokens><separator token><prompt 3 tokens>", where portions of the prompt sequences are masked. The model is trained to predict these masked portions, and in this process, learns to generate contextually appropriate prompts by considering both the leading concept and any unmasked prompts in the sequence. This masking approach further trains the model to learn bidirectional relationships between concepts and prompts, while the separator tokens help the model understand the structural boundaries between different elements in the sequence.

As part of training the machine-learning model, a determination is made as to whether a stopping criterion is met (decision block 1320), i.e., which is used to validate the machine-learning model. The stopping criterion is usable to reduce overfitting of the machine-learning model, reduce computational resource consumption, and promote an ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 1320), the procedure 1300 continues training of the machine-learning model using the training data (block 1318) in this example.

If the stopping criterion is met ("yes" from decision block 1320), the trained machine-learning model is then utilized to generate an output based on subsequent data (block 1322). The trained machine-learning model, for instance, is trained to perform a task as described above and therefore once trained is configured to perform that task based on subsequent data received as an input and processed by the machine-learning model.

Figure 14:
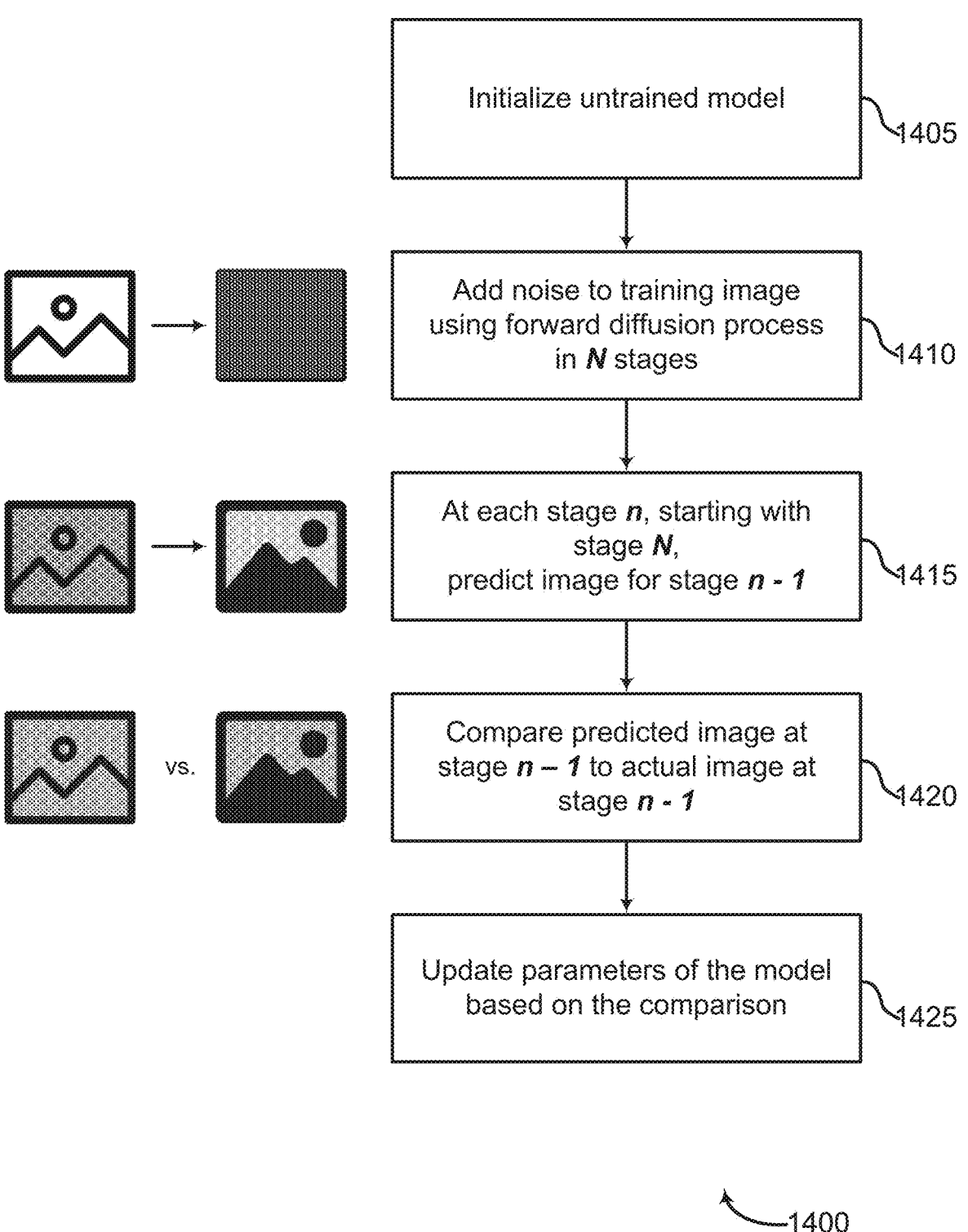
FIG. 14 shows an example of a method for training a diffusion model according to aspects of the present disclosure.

FIG. 14 shows an example of a method 1400 for training a diffusion model according to aspects of the present disclosure. In some embodiments, the method 1400 describes an operation of the training component 250 described for configuring the image generation model 245 as described with reference to FIG. 2. The method 1400 represents an example for training a reverse diffusion process as described above with reference to FIGS. 4 and 8. In some examples, these operations are performed by a system including a processor executing a set of codes to control functional elements of an apparatus, such as the guided latent diffusion model described in FIG. 4.

Additionally or alternatively, certain processes of method 1400 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1410, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1415, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1420, the system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data.

At operation 1425, the system updates parameters of the model based on the comparison. For example, parameters of a U-Net may be updated using gradient descent. Time-dependent parameters of the Gaussian transitions can also be learned.

Figure 15:
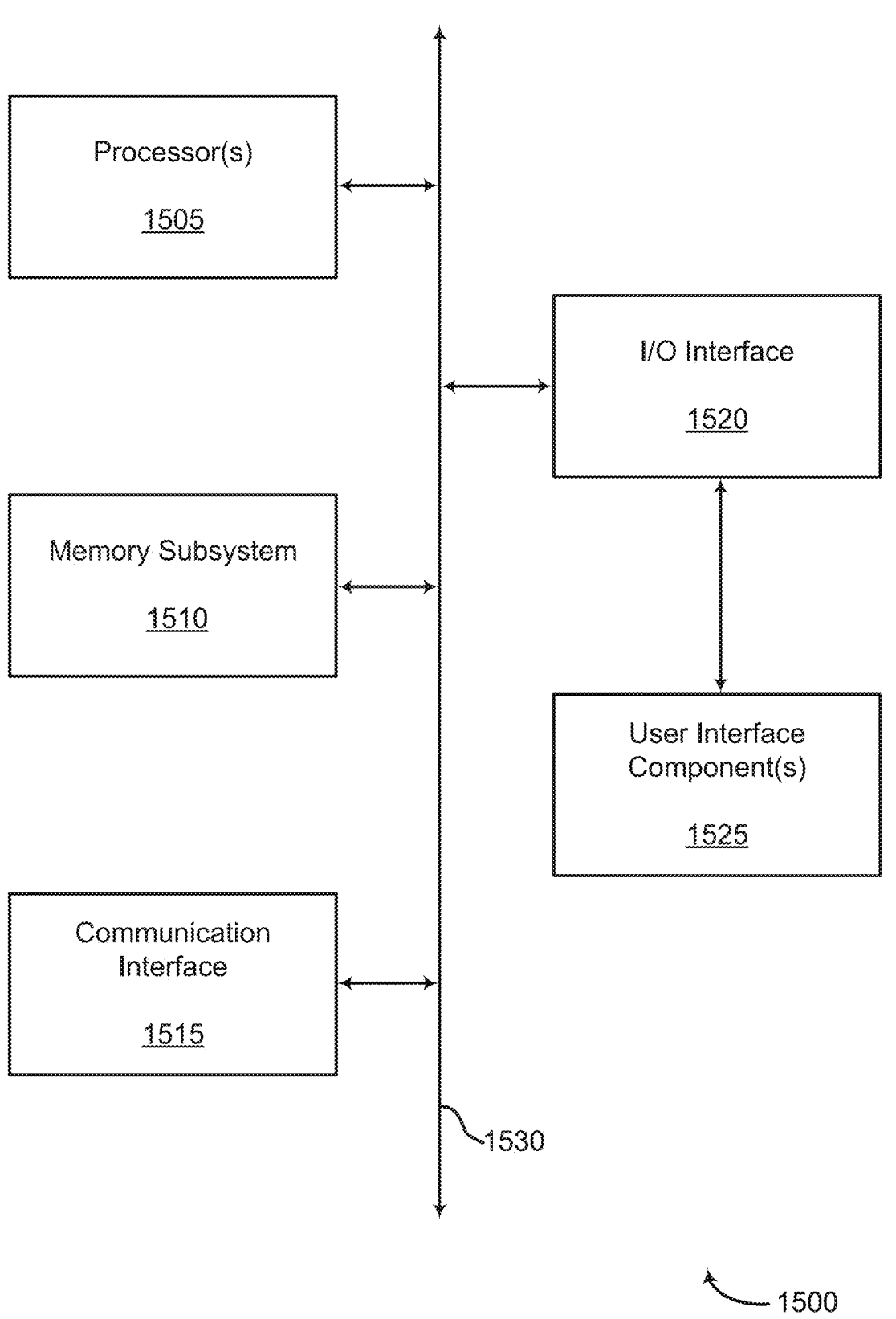
FIG. 15 shows an example of a computing device according to aspects of the present disclosure.

FIG. 15 shows an example of a computing device 1500 according to aspects of the present disclosure. The example shown includes computing device 1500, processor(s) 1505, memory subsystem 1510, communication interface 1515, I/O interface 1520, user interface component(s), and channel 1530.

In some embodiments, computing device 1500 is an example of, or includes aspects of, a prompt generation apparatus as described in FIGS. 1 and 2. In some embodiments, computing device 1500 includes one or more processors 1505 are configured to execute instructions stored in memory subsystem 1510 to obtain a sequence of text prompts; determine a session concept based on the sequence of text prompts; generate, using a prompt generation model, an image generation prompt based on the sequence of text prompts and the session concept; and generate, using an image generation model, a synthetic image based on the image generation prompt.

According to some aspects, computing device 1500 includes one or more processors 1505. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1515 operates at a boundary between communicating entities (such as computing device 1500, one or more user devices, a cloud, and one or more databases) and channel 1530 and can record and process communications. In some cases, communication interface 1515 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1520 is controlled by an I/O controller to manage input and output signals for computing device 1500. In some cases, I/O interface 1520 manages peripherals not integrated into computing device 1500. In some cases, I/O interface 1520 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1520 or via hardware components controlled by the I/O controller.

According to some aspects, user interface component(s) 1525 enable a user to interact with computing device 1500. In some cases, user interface component(s) 1525 include an audio device, such as an external speaker system, an external display device such as a display screen, an input device (e.g., a remote control device interfaced with a user interface directly or through the I/O controller), or a combination thereof. In some cases, user interface component(s) 1525 include a GUI.

Accordingly, the present disclosure includes the following aspects.

A method for prompt suggestion and personalization is described. One or more aspects of the method include obtaining a sequence of text prompts; determining a session concept based on the sequence of text prompts; generating, using a prompt generation model, an image generation prompt based on the sequence of text prompts and the session concept; and generating, using an image generation model, a synthetic image based on the image generation prompt.

Some examples of the method, apparatus, non-transitory computer readable medium, and system further include concatenating a token representing the session concept to a sequence of tokens representing the sequence of text prompts to obtain an augmented input, wherein the image generation prompt is generated based on the augmented input. Some examples further include receiving feedback on the image generation prompt. Some examples further include generating an additional image generation prompt based on the feedback and the sequence of text prompts. Some examples further include generating an additional synthetic image based on the additional synthetic image generation prompt.

Some examples of the method, apparatus, non-transitory computer readable medium, and system further include identifying a user session. Some examples further include receiving the sequence of text prompts from a user during the user session. Some examples further include generating the session concept using a concept generation model based on the sequence of text prompts.

In some aspects, the session concept comprises a predetermined image element. In some aspects, the prompt generation model is trained using training data including a training sequence of text prompts and a training concept corresponding to the training sequence of text prompts. In some aspects, the prompt generation model is trained using training data including a plurality of image captions and a training concept corresponding to the plurality of image captions.

A method for prompt suggestion is described. One or more aspects of the method include identifying a user session; receiving a sequence of text prompts during the user session; determining a session concept based on the sequence of text prompts; and generating, using a prompt generation model, an image generation prompt based on the sequence of text prompts and the session concept.

Some examples of the method, apparatus, non-transitory computer readable medium, and system further include generating, using an image generation model, a synthetic image based on the image generation prompt. Some examples further include generating the session concept using a concept generation model based on the sequence of text prompts.

In some aspects, the prompt generation model is trained using training data including a training sequence of text prompts and a training concept corresponding to the training sequence of text prompts. In some aspects, the training sequence of text prompts is filtered based on prompt consistency.

Some examples of the method, apparatus, non-transitory computer readable medium, and system further include generating sentence-level embeddings of the text prompts of the training sequence of text prompts. Some examples further include computing pairwise distances between the sentence-level embeddings. In some aspects, the prompt generation model is trained using training data including a plurality of image captions and a training concept corresponding to the plurality of image captions.

An apparatus for prompt suggestion and image generation is described. One or more aspects of the apparatus include a memory component; a processing device coupled to the memory component, the processing device configured to perform operations comprising; obtaining a sequence of text prompts; determining a session concept based on the sequence of text prompts; generating, using a prompt generation model, an image generation prompt based on the sequence of text prompts and the session concept; and generating, using an image generation model, a synthetic image based on the image generation prompt.

Some examples of the apparatus, system, and method further include a concept generation model trained to generate the session concept based on the sequence of text prompts. In some aspects, the image generation model comprises a diffusion model.

Some examples of the apparatus, system, and method further include a caption generation model configured to generate a caption based on an image, wherein the prompt generation model is trained using the caption. In some aspects, the prompt generation model comprises a transformer architecture.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a sequence of text prompts associated with a user, wherein each of the sequence of text prompts comprises an input for an image generation model;
determining a session concept text for the user based on the sequence of text prompts, wherein the session concept text describes an image element common to a plurality of the sequence of text prompts;
generating, using a prompt generation model, an image generation prompt based on the session concept text, wherein the image generation prompt describes a scene including the image element from the session concept text; and
generating, using the image generation model, a synthetic image based on the image generation prompt, wherein the synthetic image depicts the scene including the image element from the session concept text.

2. The method of claim 1, wherein generating the image generation prompt comprises:
concatenating a token representing the session concept text to a sequence of tokens representing the sequence of text prompts to obtain an augmented input, wherein the image generation prompt is generated based on the augmented input.

3. The method of claim 1, further comprising:
receiving feedback on the image generation prompt;
generating an additional image generation prompt based on the feedback and the sequence of text prompts; and
generating an additional synthetic image based on the additional image generation prompt.

4. The method of claim 1, wherein obtaining a sequence of text prompts comprises:

identifying a user session; and
receiving the sequence of text prompts from a user during the user session.

5. The method of claim 1, wherein determining the session concept text comprises:
generating the session concept text using a concept generation model based on the sequence of text prompts.

6. The method of claim 1, further comprising:
presenting the synthetic image to the user via a graphical user interface (GUI).

7. The method of claim 1, wherein:
the prompt generation model is trained to generate image generation prompts using training data including a training sequence of text prompts and a training concept corresponding to the training sequence of text prompts.

8. The method of claim 1, wherein:
the prompt generation model is trained to generate image generation prompts using training data including a plurality of image captions and a training concept corresponding to the plurality of image captions.

9. A non-transitory computer readable medium storing code for prompt generation, the code comprising instructions that, when executed by at least one processor, cause the at least one processor to perform operations comprising:
identifying a user session;
receiving a sequence of text prompts during the user session, wherein each of the sequence of text prompts comprises an input for an image generation model;
determining a session concept text based on the sequence of text prompts;
generating, using a prompt generation model, an image generation prompt based on the session concept text, wherein the image generation prompt describes a scene including the image element from the session concept text; and
generating, using the image generation model, a synthetic image based on the image generation prompt, wherein the synthetic image depicts the scene including the image element from the session concept text.

10. The non-transitory computer readable medium of claim 9, the operations further comprising:
presenting the synthetic image to the user via a graphical user interface (GUI).

11. The non-transitory computer readable medium of claim 9, the operations further comprising:
generating the session concept text using a concept generation model based on the sequence of text prompts.

12. The non-transitory computer readable medium of claim 9, wherein:
the prompt generation model is trained to generate image generation prompts using training data including a training sequence of text prompts and a training concept corresponding to the training sequence of text prompts.

13. The non-transitory computer readable medium of claim 12, wherein:
the training sequence of text prompts is filtered based on prompt consistency.

14. The non-transitory computer readable medium of claim 12, the operations further comprising:
generating sentence-level embeddings of the text prompts of the training sequence of text prompts; and
computing pairwise distances between the sentence-level embeddings.

15. The non-transitory computer readable medium of claim 9, wherein:

the prompt generation model is trained to generate image generation prompts using training data including a plurality of image captions and a training concept corresponding to the plurality of image captions.

16. A system comprising:

a memory component;

a processing device coupled to the memory component, the processing device configured to perform operations comprising:

obtaining a sequence of text prompts associated with a user, wherein each of the sequence of text prompts comprises an input for an image generation model;

determining a session concept text for the user based on the sequence of text prompts, wherein the session context text describes an image element common to a plurality of the sequence of text prompts;

generating, using a prompt generation model, an image generation prompt based on the session concept text, wherein the image generation prompt describes a scene including the image element from the session concept text; and generating, using the image generation model, a synthetic image based on the image generation prompt, wherein the synthetic image depicts the scene including the image element from the session concept text.

17. The system of claim 16, the system further comprising:

a concept generation model trained to generate the session concept text based on the sequence of text prompts.

18. The system of claim 16, wherein:

the image generation model comprises a diffusion model.

19. The system of claim 16, the system further comprising:

a caption generation model configured to generate a caption based on an image, wherein the prompt generation model is trained using the caption.

20. The system of claim 16, wherein:

the prompt generation model comprises a transformer architecture.

* * * * *